(12) United States Patent
Hasegawa et al.

(10) Patent No.: US 11,655,944 B2
(45) Date of Patent: May 23, 2023

(54) LIGHTING DEVICE

(71) Applicant: Japan Display Inc., Tokyo (JP)

(72) Inventors: Makoto Hasegawa, Tokyo (JP); Takeo Koito, Tokyo (JP); Nobuyuki Suzuki, Tokyo (JP); Masafumi Okada, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/569,525

(22) Filed: Jan. 6, 2022

(65) Prior Publication Data

US 2022/0260217 A1    Aug. 18, 2022

(30) Foreign Application Priority Data

Feb. 18, 2021  (JP) .............................. JP2021-024054

(51) Int. Cl.
| | |
|---|---|
| *F21V 11/06* | (2006.01) |
| *F21Y 115/10* | (2016.01) |
| *F21K 9/233* | (2016.01) |
| *F21K 9/61* | (2016.01) |
| *F21V 8/00* | (2006.01) |
| *F21V 14/00* | (2018.01) |
| *F21V 5/00* | (2018.01) |

(52) U.S. Cl.
CPC ................ *F21K 9/233* (2016.08); *F21K 9/61* (2016.08); *F21V 5/005* (2013.01); *F21V 11/06* (2013.01); *F21V 14/003* (2013.01); *G02B 6/003* (2013.01); *G02B 6/0053* (2013.01); *F21Y 2115/10* (2016.08)

(58) Field of Classification Search
CPC ............. G02B 6/0053; G02F 1/133524; G02F 1/133606
See application file for complete search history.

(56) References Cited

U.S. PATENT DOCUMENTS

| | | | |
|---|---|---|---|
| 2006/0291243 A1* | 12/2006 | Niioka | ................ F21V 33/0052 362/606 |
| 2012/0008070 A1* | 1/2012 | Takemoto | .............. G02B 3/005 349/96 |
| 2014/0028924 A1 | 1/2014 | Yamaguchi et al. | |
| 2015/0168632 A1* | 6/2015 | Yasuhara | ............. G02B 6/0051 362/606 |
| 2018/0074375 A1* | 3/2018 | Koito | ................ G02F 1/133504 |

FOREIGN PATENT DOCUMENTS

| | | |
|---|---|---|
| JP | 2012-69409 A | 4/2012 |
| WO | 2012/099127 A1 | 7/2012 |

* cited by examiner

*Primary Examiner* — Eric T Eide
(74) *Attorney, Agent, or Firm* — Xsensus LLP

(57) ABSTRACT

The purpose of the present invention is to realize a lighting device of small light distribution angle and less leakage light and further to realize a lighting device in which the light beam is easy to control. The following is an example of the structure to meet the above purpose. A lighting device including: a light guide; LEDs set at a side surface of the light guide; a prism sheet set on a major surface of the light guide, in which a first louver which extends in a first direction and, a second louver which extends in an orthogonal direction to the first direction are superposed on the prism sheet.

15 Claims, 26 Drawing Sheets

X-X $\theta = 2\sin^{-1}\{n\sin(\tan^{-1}(a/t))\}$

A-A

A-A

A-A $\theta = 2\sin^{-1}\{\sin(\tan^{-1}(a/t))\}$

C-C

LIGHTING DEVICE

CROSS-REFERENCE TO RELATED APPLICATION

The present application claims priority from Japanese Patent Application JP 2021-024054 filed on Feb. 18, 2021, the content of which is hereby incorporated by reference into this application.

BACKGROUND OF THE INVENTION

(1) Field of the Invention

The present invention relates to the lighting device of thin, small light distribution angle, and less leakage light to the surrounding.

(2) Description of the Related Art

Collimated light is sometimes needed in the seats of airplanes or trains. There are demands in cars and so forth to emit light in different directions according to purposes. On the other hand, there is a demand to emit light in different directions from the light source. In such a situation, there are measures as: change a direction of light source; providing a reflecting plate to change a direction of light from the light source; providing a lens to change a direction of light from the light source, and so forth.

Further, there is a demand to change light distribution angle by setting a lens at the emitting surface of the lighting device. In such a case if a liquid crystal lens is used, a focus of the lens can be changed easily. In addition, the liquid crystal lens can flexibly change its function to meet various applications.

Patent document 1 discloses a structure of lighting device, in which a refracting means is set over a direct type light source to change a direction of the light. As for the light refracting means, lenses, prisms, liquid lenses, liquid crystal lenses and so forth are disclosed.

Patent document 2 discloses to use a liquid crystal lens in various optical devices.

PRIOR TECHNICAL DOCUMENT

Patent Document

Patent document 1: Japanese patent application laid open No. 2012-069409
Patent document 2: WO 2012/099127 A1

SUMMARY OF THE INVENTION

Among lighting devices, when it is used e.g. for spot light, a lighting device of high directivity, that is to say, a lighting device of small light distribution angle is required. Conventionally, a parabolic mirror has been used to get a parallel light. Such a lighting device, however, needs a large depth, therefore, it is difficult to make a size of the lighting device smaller or thinner.

On the other hand, it is difficult for the thin lighting device to get small light distribution angle. In addition, there arises a problem of a leakage light which has a very large emitting direction angle.

The purpose of the present invention is to realize a lighting device of thin, small light distribution angle, and low leakage light. Another purpose of the present invention is to realize a lighting device, which can control emitting light accurately by setting a liquid crystal lens at the emitting surface of the lighting device.

The present invention solves the above explained problems; examples of concrete structures of the present invention are as follows.

(1) A lighting device including: a light guide; LEDs set at a side surface of the light guide; a prism sheet set on a major surface of the light guide, in which a first louver which extends in a first direction and a second louver which extends in an orthogonal direction to the first direction are superposed on the prism sheet.

(2) The lighting device according to (1) in which a liquid crystal lens is disposed above the prism sheet.

(3) A lighting device including: a light guide; LEDs set at a side surface of the light guide; a prism sheet set on a major surface of the light guide, in which a first louver which extends in a first direction and, a second louver which extends in a orthogonal direction to the first direction are formed in a same plane crossing to each other on the prism sheet.

(4) A lighting device including: a light guide; LEDs set at a side surface of the light guide; a prism sheet set on a major surface of the light guide, in which a louver having a honey comb structure in a plan view is disposed on the prism sheet.

DETAILED DESCRIPTION OF THE PREFERRED EMBODIMENTS

Figure 1:
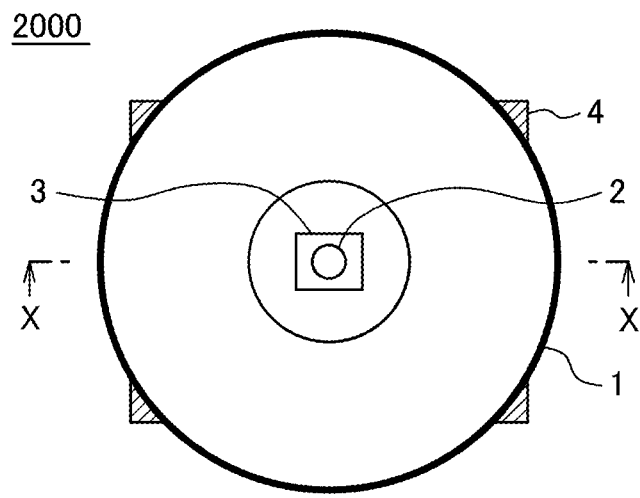
FIG. 1 is a plan view of a lighting device in which a parabolic mirror is used to project collimated light.
Figure 2:
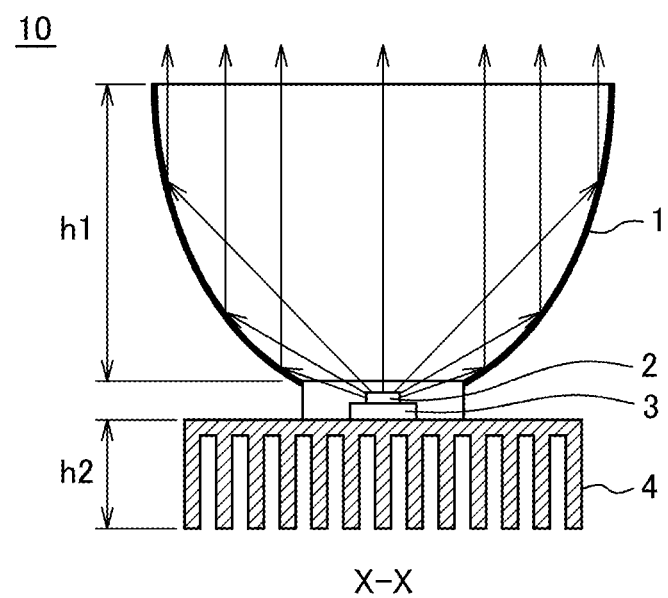
FIG. 2 is a cross sectional view of FIG. 1 along the line X-X.

FIGS. 1 and 2 show an example of a lighting device 2000 for spot light, which emits collimated light. Conventionally, so called a parabolic mirror 1, which is depicted in FIGS. 1 and 2, has been used to acquire such a collimated light. FIG. 1 is a plan view of the lighting device 2000, which uses a parabolic mirror, and FIG. 2 is a cross sectional view of the lighting device 2000. In FIG. 1, an LED 2 is disposed at the center of a parabolic mirror 1. The LED 2 is set e.g. on an LED substrate 3. Since a high luminescent LED is used for the LED 2, it becomes high temperature; thus, the LED is set on a heat sink 4. A part of the heat sink is visible in FIG. 1.

FIG. 2 is a cross sectional view of FIG. 1 along the line X-X. In FIG. 2, the LED 2 is disposed at the bottom of a parabolic mirror 1. The light emitted from the LED 2, other than the light goes directly upward, reflects at the parabolic mirror, and becomes a parallel light along the light axis. However, the parabolic mirror 1 must have enough height h1 so that the parabolic mirror 1 can perform enough function. The height h1 of approximately 60 mm is necessary for the parabolic mirror 1 to get approximately 12 degrees of light distribution angle. In addition, in actual lighting device, the height h2 of the heat sink 4, e.g. approximately 20 mm, is added, thus, a thickness of the entire lighting device becomes 80 mm or more.

The purpose of the present invention is to realize a thin lighting device that can emits collimated light; in addition, to realize the lighting device that can control the distribution angle of the light from the lighting device, or can control the emitting direction of the light from the emitting surface. The present invention is concretely explained by the following embodiments.

Embodiment 1

Figure 3:
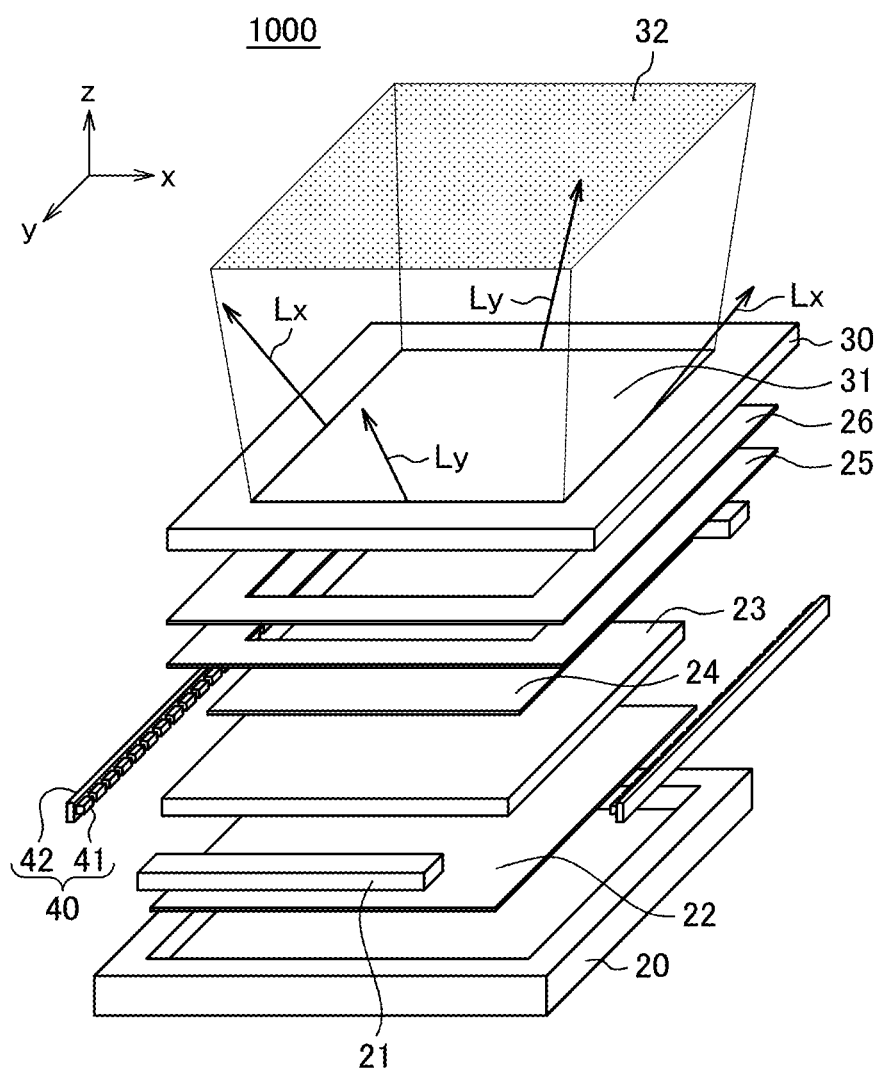
FIG. 3 is an exploded perspective view of a side light type lighting device.

FIG. 3 is an exploded perspective view of a lighting device 1000 relating to embodiment 1. FIG. 3 is a so called side light type light source, in which LED arrays 40 are set at the side surfaces of a light guide 23, and thus, the lighting device can be made thin as a whole. A thickness of the light guide 23, which is the thickest component among the components in FIG. 3, is approximately 2 mm.

The LED arrays 40 are set at opposing two side surfaces of the light guide 23. The structure of LED array 40 is that plural LEDs 41 are arranged in y direction on an LED substrate 42. The light guide 23 has a role to change a direction of light, which enters the light guide 23 from the side surface, to the major surface of the light guide 23. A reflection sheet 22 is disposed at the bottom of the light guide 23 to reflect light, which comes down from the light guide 23, to upper direction.

The LED array 40 and other optical components are accommodated in an outer frame 20 made from metal; a resin frame 21 is used to fix the optical components in the outer frame 20. A prism sheet 24 is set on the light guide 23 to collimate the light, which emits from the light guide 23, in a direction of light axis. A spacer 25 is set on the prism sheet 24 at its periphery; the light shading tape 26 is set on the spacer 25 to define an emitting surface 31. A transparent cover 30 is set on the light shading tape 26.

In FIG. 3, the collimated light 32 is emitted from the emitting surface 31 of the transparent cover 30; in addition to the collimated light 32 indicated by parallelogram, leakage light indicated by Lx and Ly exists. There arises a problem that the outline of the emitting light is blurred due to the existence of the leakage light. In addition, this leakage light is difficult to control when the emitting light is intended to be converged, diverged, or changed its direction by setting refraction means at the emitting surface 31.

Figure 4:
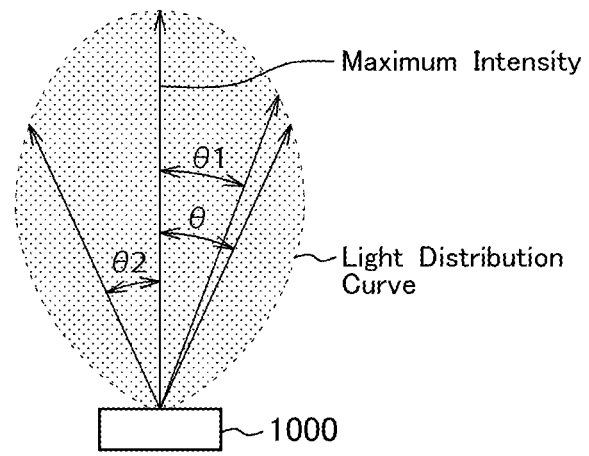
FIG. 4 is a model to explain light distribution curve.

FIG. 4 is a curve of a light distribution of the light emitted from the lighting device 1000. In FIG. 4, the light distribution of the light emitted from the lighting device 1000 can be represented by elliptical light distribution curve. In FIG. 4, a length of the arrow is an intensity of the light, a polar angle θ is a direction of the light. In FIG. 4, the intensity of the light is largest at the light axis, namely, when θ is zero. The intensity of light becomes smaller according to an increase in the polar angle θ. The light distribution curve shown in FIG. 4 is different between in x direction and in y direction, defined in FIG. 3.

Figure 5:
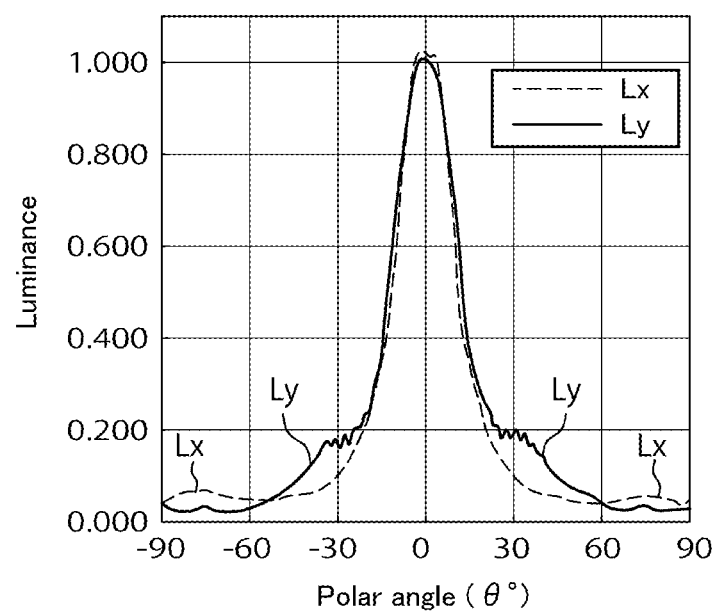
FIG. 5 is a graph which shows light distribution characteristics of the lighting device of FIG. 3.

FIG. 5 is a light distribution angle characteristics of the lighting device of FIG. 3. That is to say, FIG. 5 expresses the light distribution curve of FIG. 4 by taking the angle as abscissa and the intensity as ordinate in each of x direction and in y direction defined in FIG. 3. The abscissa of FIG. 5 is a polar angle (degree), the ordinate is a relative intensity when the intensity on the light axis (polar angle is zero) is 1. In FIG. 5, the intensity of the light is a smooth curve resembling to a normal distribution curve up to the polar angle is 20 degrees; however, the curve substantially deviates from a normal distribution when polar angle becomes bigger than 20 degrees. This region corresponds to leakage light Lx and Ly. In the light distribution of FIG. 4, the left side from the light axis (the polar angle θ=0) is a light distribution in x direction, which corresponds to Lx curve in FIG. 5; the right side from the light axis (the polar angle θ=0) is a light distribution in y direction, which corresponds to Ly curve in FIG. 5. When the polar angle θ in both x direction and y direction is 30 degrees, the intensity of light in y direction is larger than the intensity of light in x direction.

As shown in FIG. 5, the distribution of leakage light is different between in x direction and in y direction. This is because the LED array 40 has an aligning direction in y direction. In any events, since the leakage light Lx and Ly are not collimated, they reveal a phenomenon that an outline of the projected light is blurred when the lighting device is used as a projector. In addition, when it is intended to refract or to deflect the emitting light by setting a refraction means at the emitting surface 31 of the lighting device 1000, those leakage light as Lx, Ly are difficult to control.

Figure 6:
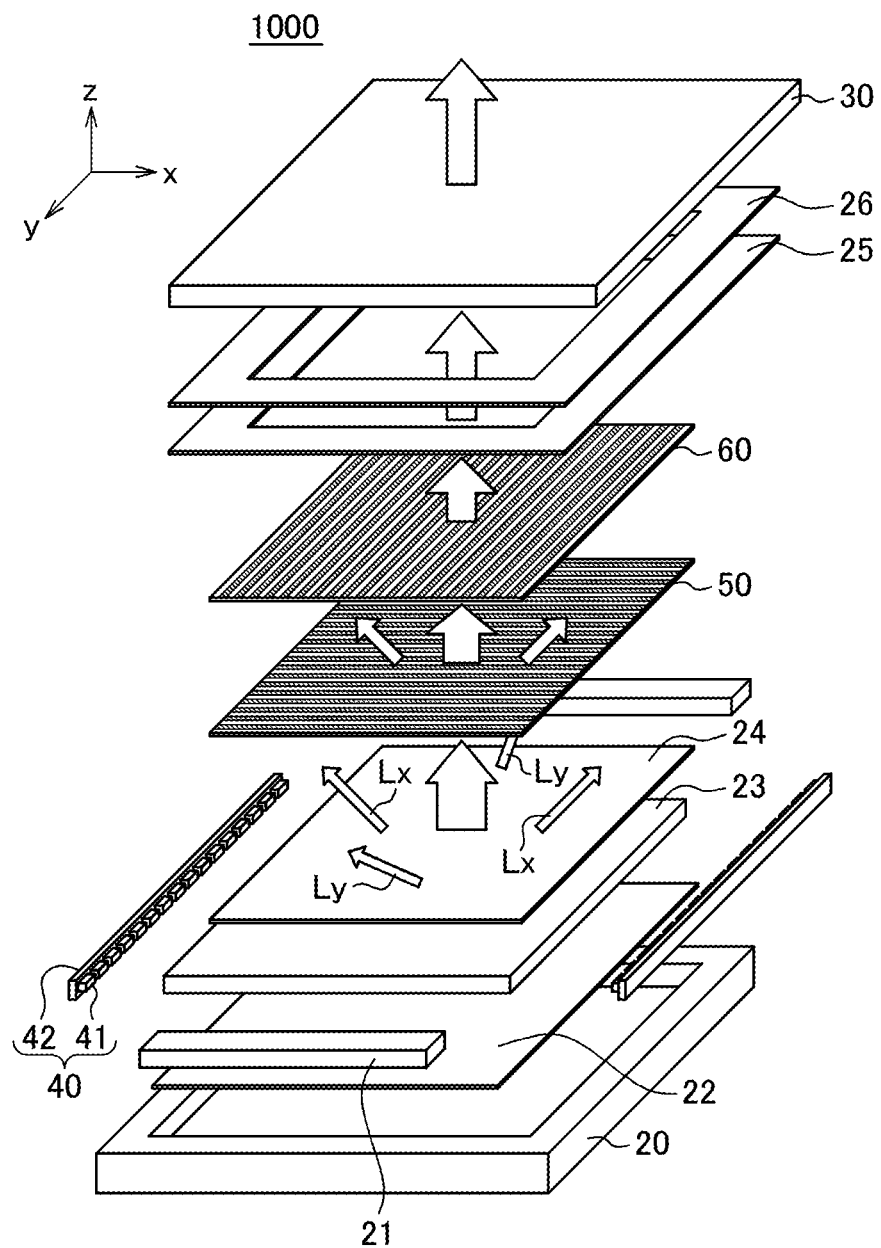
FIG. 6 is an exploded perspective view of the lighting device according to embodiment 1.

FIG. 6 is an exploded perspective view of the lighting device 1000 according to embodiment 1, which overcomes the above explained problems. In FIG. 6, the structure from the reflection sheet 22 to the prism sheet 24 is the same as explained in FIG. 5. The feature of FIG. 6 is cross louvers 50 and 60 between the prism sheet 24 and the transparent cover 30. The cross louver includes the first louver 50, in which louver blades extend in x direction and the second louver 60, in which louver blades extend in y direction; and the first louver 50 and the second louver 60 are superposed in orthogonal direction.

The first louver 50 shades the leakage light in y direction; the second louver 60 shades the leakage light in x direction. As a result, the light distribution, which does not have leakage light in x direction and in y direction, can be acquired. By the way, the first louver 50 and the second louver 60 can be superposed or the first louver 50 and the second louver can be formed integrally. The height of louver can be different between the first louver 50 and the second louver 60 according to necessity.

Figure 7:
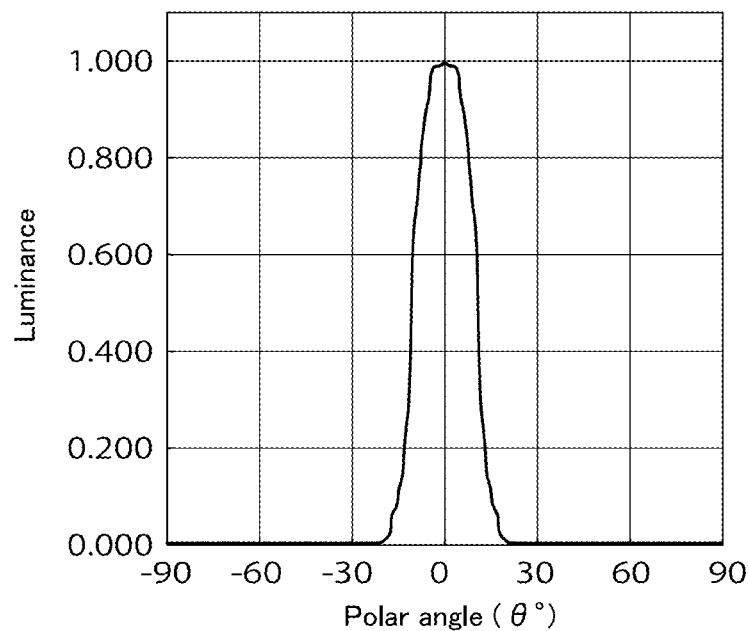
FIG. 7 is a graph which shows light distribution characteristics of the lighting device of FIG. 6.

FIG. 7 is a graph of light distribution of the lighting device of FIG. 6. The abscissa and the ordinate of FIG. 7 are the same as explained in FIG. 5. In comparing FIG. 7 and FIG. 5, at the outset, the light distribution is improved. That is to say, when compared in the same polar angle, the relative intensity in FIG. 7 is smaller compared with the relative intensity in FIG. 5. In other words, the light directivity is improved in FIG. 7.

The second feature of FIG. 7 is that the leakage light Lx and Ly in FIG. 5, which is leakage light from the lighting device 1000, does not exist in FIG. 7. The third feature of FIG. 7 is that light distribution is not different between in x direction and in y direction. That is to say, the light distribution in x direction and the light distribution in y direction are depicted by the same curve in FIG. 7. Therefore, the lighting device 1000 according to FIG. 6 can provide a projection light of high directivity, less blur and high uniformity.

Figure 8:
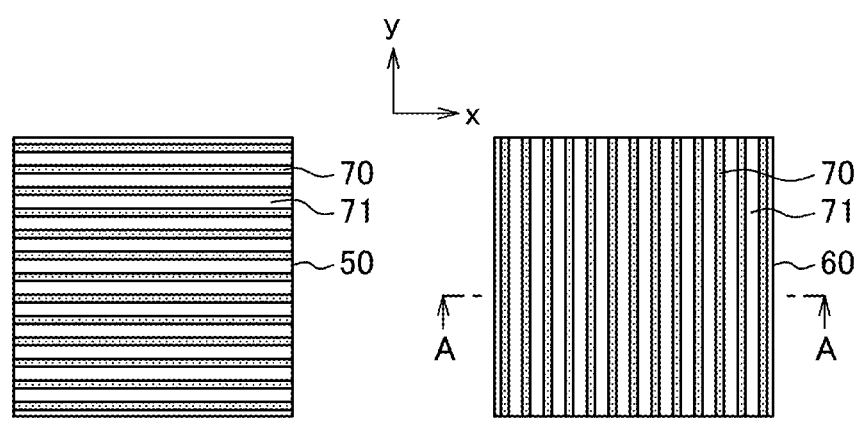
FIG. 8 is plan views of a first louver and a second louver.

FIG. 8 is plan views of the first louver 50 and the second louver 60. Louver blades 70 of the first louver 50 extend in x direction and the louver blades 70 of the second louver 60 extend in y direction. Transparent resin 71 exists between the louver blades to keep a shape of the first louver 50 or second louver 60.

Figure 9:
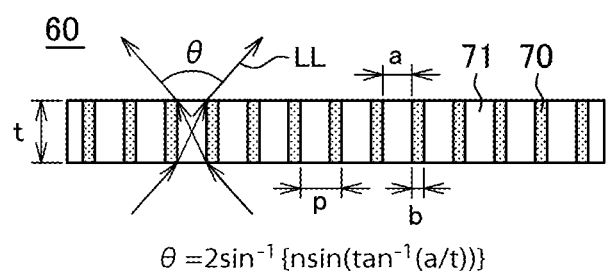
FIG. 9 is a cross sectional view of a louver.

FIG. 9 is a cross sectional view along the line A-A of the louver 60 of FIG. 8. In FIG. 9, the pitch p of the louver blades 70 is e.g. 0.1 mm, a thickness b of the louver blade 70 is 0.0185 mm, the height h of the louver blade 70 is 0.7 mm. The louver blade 70 is formed from black silicone resin; most of the light impinging to the louver blade 70 is absorbed by the louver blade 70. On the other hand, the transparent resin 71 is formed from silicone rubber of high transparency.

FIG. 9 shows a light path in the louver 60. The arrow LL is a light path in FIG. 9. The light incident in the louver 60 refracts according to a refractive index of the transparent resin 71 in the louver 60. The distribution angle θ of light, which exits from the louver 60 is determined by formula (1), in which refractive index of the transparent resin 71 to the air is n, a height of louver is t, a width between the louver blades is a.

$$\theta = 2\sin^{-1}\{n\sin(\tan^{-1}(a/t)\}$$ (formula 1)

Figure 10:
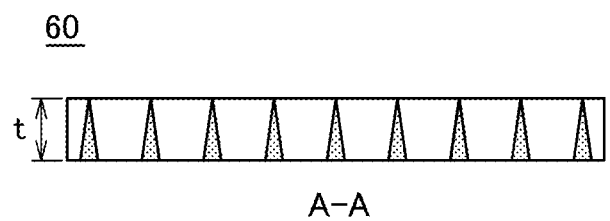
FIG. 10 is a cross sectional view of a louver of another example.

FIG. 10 shows when a cross section of the louver blade 70 is triangle, not rectangle. This structure can be used when a light distribution angle is wanted to be changed without changing the outer shape of the louver. By the way, a candidate of alternative cross section of the blade 70 is not necessarily limited to triangular, it can be trapezoidal and so forth.

Figure 11:
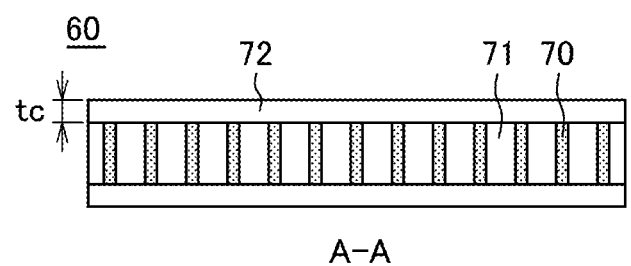
FIG. 11 is a cross sectional view of a louver of yet another example.

FIG. 11 is an example that a louver cover 72 of transparent resin is set at the top and at the bottom of the louver. The louver cover 72 is used when a mechanical strength of the louver is necessary. The louver cover 72 is formed from e.g. polycarbonate, a thickness is e.g. 0.2 mm. Other structures of FIG. 11 are the same as FIG. 9.

Figure 12:
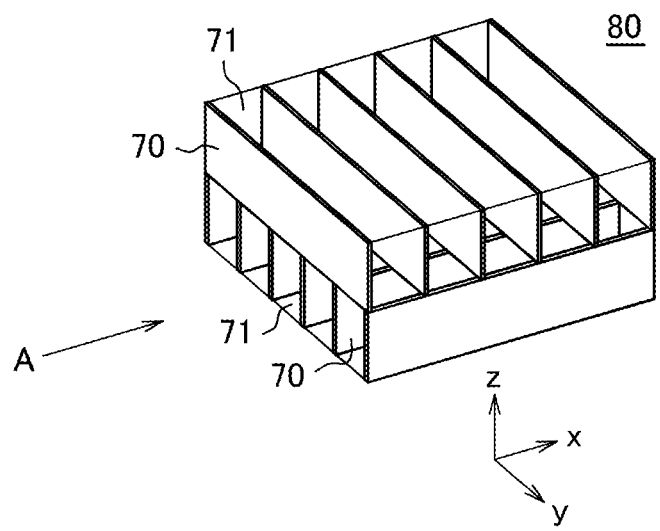
FIG. 12 is a perspective view of a unitized cross louver.

The cross louver can be provided as one piece. FIG. 12 is a perspective view of unitized cross louver 80. In FIG. 12, the first louver and the second louver are formed as one piece; other structures are the same as explained in FIG. 8 and FIG. 9. That is to say, the louver blades 70 of the lower louver extend in x direction, and the louver blades 70 of the upper louver extend in y direction. The transparent resin 71 exists between the louver blades 70.

Figure 13:
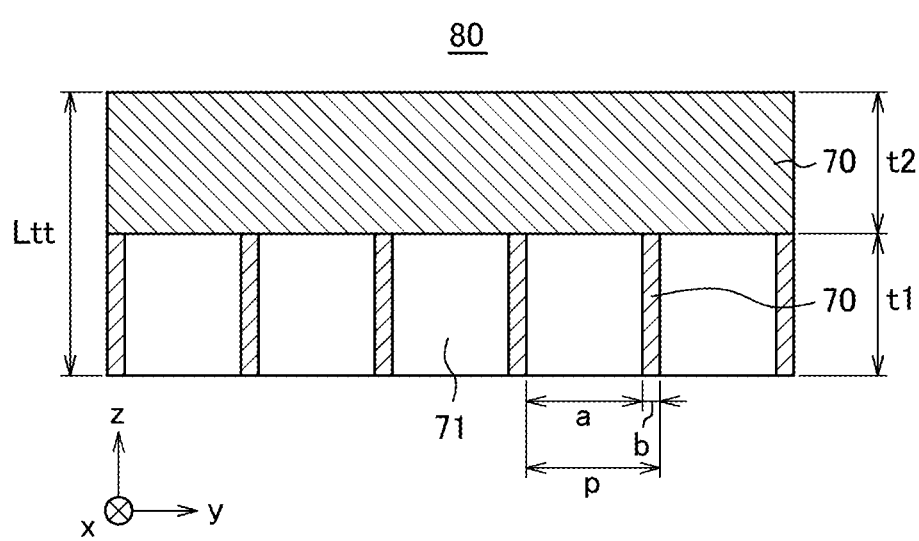
FIG. 13 is a side view of the unitized cross louver.

FIG. 13 is a side view when FIG. 12 is viewed from the direction of arrow A. The basic structure of the upper louver and the lower louver are the same as explained in FIG. 8. In FIG. 13, a height of the lower louver is t1 and a height of the upper louver is t2. However, t1 and t2 can be same. If light distribution angle is desired to be changed between in x direction and in y direction, t1 can be made different from t2.

Figure 14:
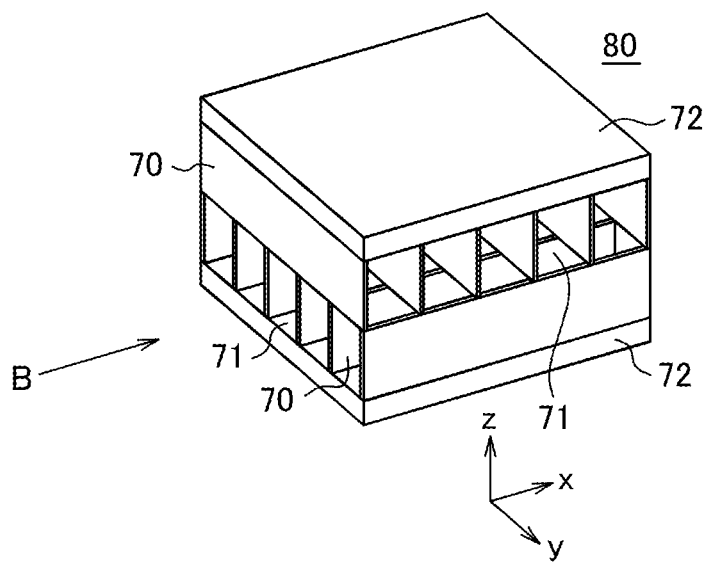
FIG. 14 is a perspective view of a unitized cross louver of another example.
Figure 15:
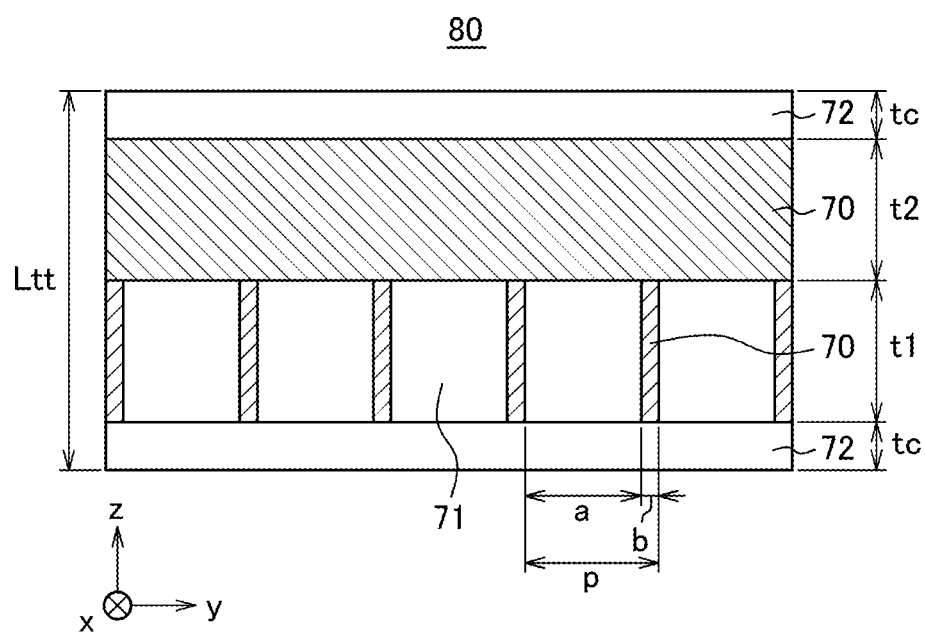
FIG. 15 is a side view of the unitized cross louver of another example.

FIG. 14 is the case the louver cover 72 is disposed at the top and at the bottom of the cross louver. The louver cover 72 is used when a mechanical strength is needed for the cross louver. FIG. 15 is a side view of the cross louver of FIG. 14 viewed from the direction of arrow B in FIG. 14.

The louver cover 72 is formed from e.g. polycarbonate, a thickness tc is e.g. 0.2 mm. Other structures of FIG. 15 are the same as explained in FIG. 13.

Figure 16:
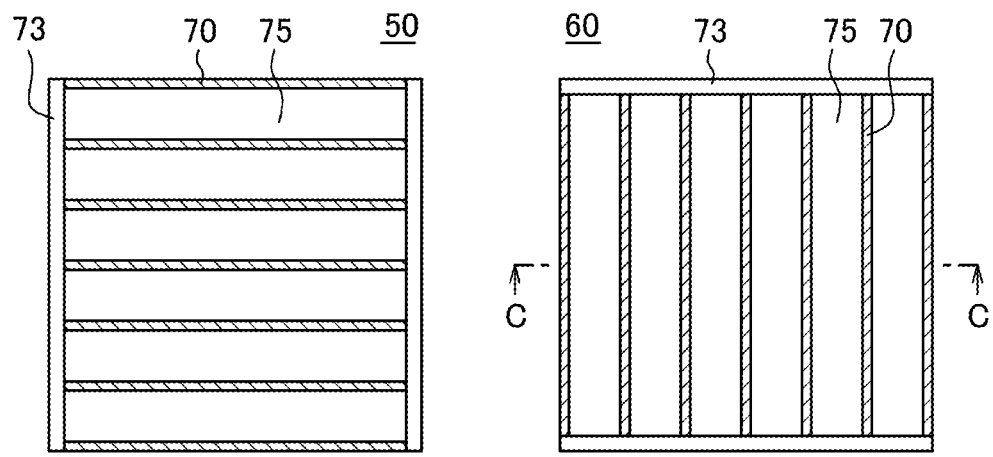
FIG. 16 is a plan views of the first louver and the second louver, in which transparent resin does not exist.
Figure 17:
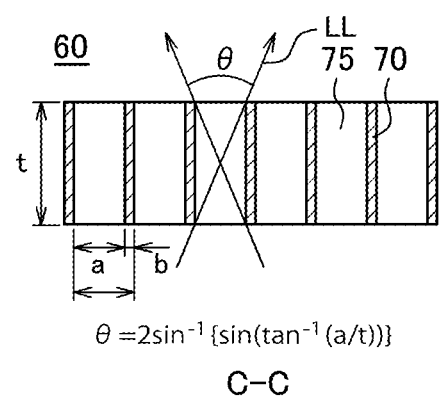
FIG. 17 is a cross sectional view of FIG. 16 along the line C-C.

The louvers explained in regard to FIG. 8 to FIG. 15 have the transparent resin 71 between the louver blades 70. If the refractive index n of the transparent resin 71 is large, the light distribution angle also becomes large. The light distribution angle can be made smaller if a space between the louver blades 70 is empty. FIGS. 16 and 17 are examples of that structure. In FIG. 16, the left hand side drawing is a plan view of the first louver 50 and the right hand side drawing is a plan view of the second louver 60. The structures of the first louver 50 and the second louver 60 are the same, however, the first louver 50 and the second louver 60 are rotated 90 degrees in a plan view to each other in FIG. 16.

In FIG. 16, the louver blades 70 can be black resin or metal. There is a space 75 between the louver blades 70, and resin does not exist between the louver blades 70. A louver frame 73 is arranged to prevent the louver blades 70 are disassembled. The louver frame 73 can be formed from e.g. polycarbonate of a thickness of 0.2 mm, or formed from metal. In FIG. 16, the louver frame 73 is formed only at the upper side and lower side (in louver 60), or at the left side and the right side of the louver (in louver 50); however, the louver frame 73 can be formed at all the sides of the louver.

FIG. 17 is a cross sectional view of FIG. 16 along the line C-C. The arrow LL is a light path in FIG. 17. In FIG. 17, a refraction does not occur because the space 75 between the blades 70 is empty. The distribution angle θ of light, which exits from the louver 60 is determined by formula (2). Comparing FIG. 9 and FIG. 17, the light distribution angle θ can be made smaller in FIG. 17 because of difference in refractive index n.

$$\theta = 2\sin^{-1}\{\sin(\tan^{-1}(a/t))\} \quad \text{(formula 2)}$$

Figure 18:
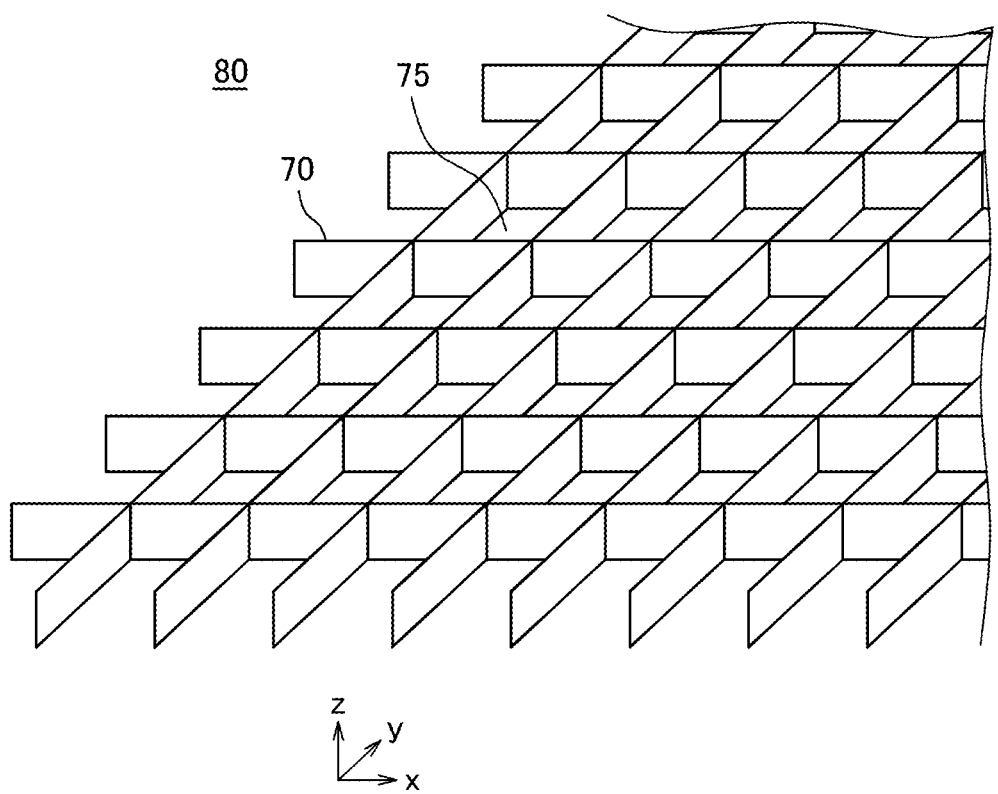
FIG. 18 is a perspective view of a grid shaped cross louver.

FIG. 18 is a perspective view when the cross louver 80 is formed as one piece. The structure of FIG. 18 can attain the function of the cross louver with a single sheet louver by setting the louver blades 70 in lattice structure in the same plane. In FIG. 18, inside of the lattice is the space 75. The lattice in FIG. 18 can be formed from metal or black resin as the same as explained in FIG. 16; a thickness, a height, a pitch and so forth can be changed according to desired light distribution angle. For example, a thickness t of the louver blade 70, a width a of the space 75 between the louver blades 70, a height h of the louver blade 70, and so forth are determined in referring FIG. 9.

If the shape of the lattice of FIG. 18 is not stable, the louver frame 73, formed from polycarbonate and the like, can be disposed as explained in FIG. 16. A light path or a light distribution angle in each of the cells of the lattice of FIG. 18 are the same as explained in FIG. 17. The light path can be expressed by (formula 2). In FIG. 18, it is an empty space inside the cell of the lattice structure, however, the transparent resin 71 can be filled in the cell of the lattice structure. In that case, a light path is defined by (formula 1).

Figure 19:
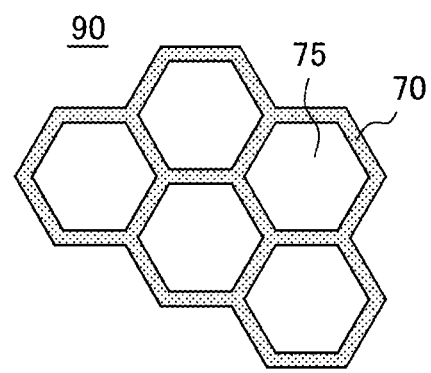
FIG. 19 is a plan view of a cross louver having honey comb structure.

FIG. 19 is a plan view of the louver 90 having a honey comb structure. In FIG. 19, the honey come structure is formed from the louver blades 70 made of black resin or metal; each of the cells has an empty space 75. The collimate effect is the same as defined by (formula 2). In a plan view, the same honey comb structure is repeated in every 60 degrees rotation, thus, assembly error of the honey comb structure in rotation direction can be suppressed. In addition, moire, which is formed by interference with the prism sheet 24, as will be explained later, is less likely to be generated.

The honey comb structure in FIG. 19 can be formed by metal or black resin as the same as explained in FIG. 16. A thickness or a height of the louver blade 70, and a pitch between the louver blades 70 and so forth are determined according to a required light distribution angle. For example, a height t of the louver, a width a of the space, and a thickness b of the louver blade 70 and so forth are determined according FIG. 9.

In FIG. 19, each of the cells in a honey comb louver 90 is the empty space 75; however, transparent resin can be filled in the spaces of the cells. In this case, the collimating effect can be expressed by (formula 1). Further, the louver cover 72 can be used to increase a mechanical strength of the louver if necessary.

Figure 20:
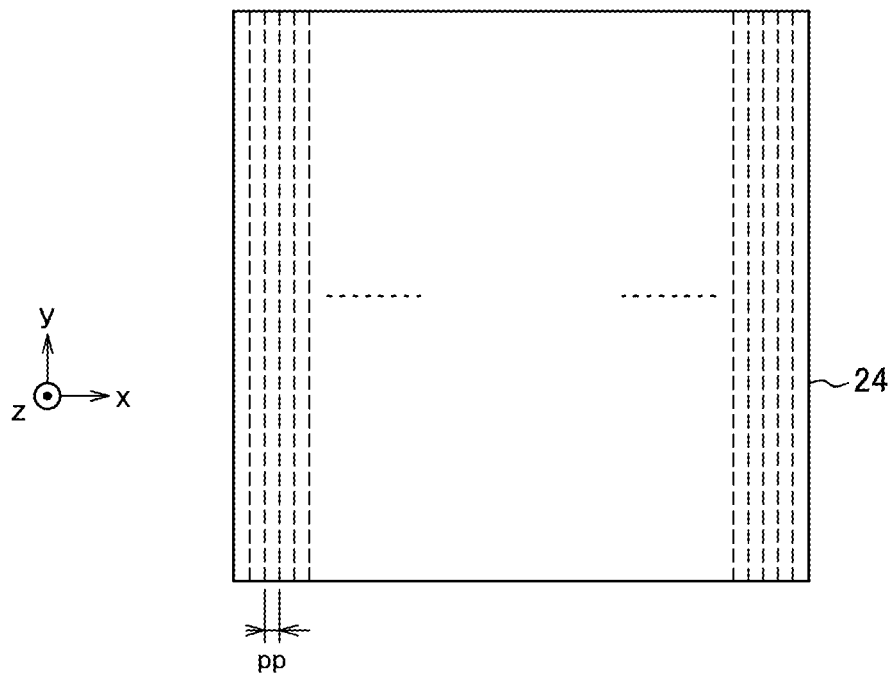
FIG. 20 is a detailed view of a prism sheet.
Figure 20:
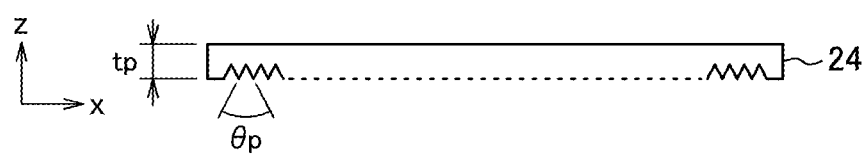
Figure 20:
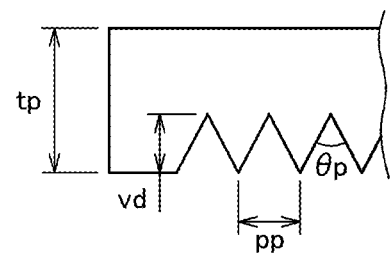

In the structure of embodiment 1 shown in FIG. 6, the reverse prism sheet 24 is used to collimate the light. The reverse prism sheet has the prism surface at the bottom surface. FIG. 20 is a detailed view of the reverse prism sheet 24. In the prism sheet 24 of FIG. 20, the prism arrays, formed by V grooves, extend in y direction and are arranged in x direction. In the meantime, two prism sheets can be used according to necessity. In this case, the two prism sheets are superposed as that two prism arrays cross orthogonally to each other.

Examples of dimensions of the prism sheet are as follows. A thickness tp of the prism sheet 24 is e.g. 0.125 mm, a depth Vd of the V groove is e.g. 0.075 mm, an apex angle θp is e.g. 66 degrees, a pitch pp is e.g. 0.1 mm. The prism sheet 24 in FIG. 20 collimates the light diverging in x direction to a normal direction to the emitting surface, namely in z direction.

Figure 21:
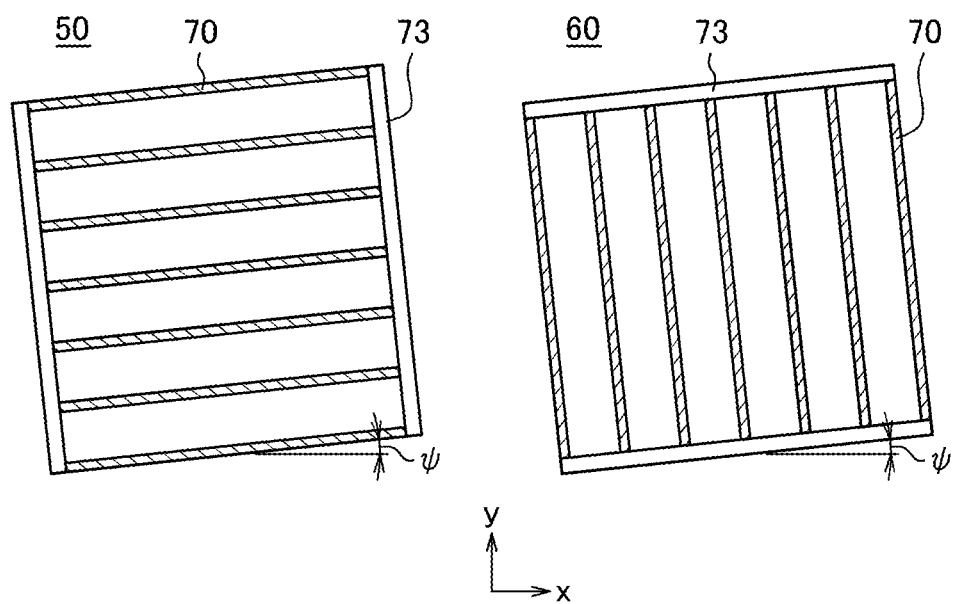
FIG. 21 is a configuration of the first louver and the second louver according to embodiment 1.

In the prism sheet 24 in FIG. 20, in microscopic view, vertical stripes appear repeatedly with a horizontal pitch pp of the prism array. Therefore, a moire tends to be generated by interference with the second louver 60 of FIG. 8. In order to prevent this phenomenon, e.g. the second louver 60 is rotated in φ degrees in a plan view as depicted in FIG. 21. The value of φ is e.g. 3 degrees or 4 degrees, that is to say, 3 degrees or more. In this case the first louver is also rotated in same value.

The prism arrays in the prism sheet of FIG. 20 extend in y direction, however, there is a case that the prism arrays extend in x direction. In this case, an interference between the prism array and e.g. the first louver 50 becomes a problem; this phenomenon also can be overcome by the same measure explained above. In the meantime, the prism sheet 24 can be rotated instead of a rotation of the louver 50 or the louver 60.

By the way, the louver may interfere with electrodes of the liquid crystal lens, which is explained in embodiment 2, resulting a generation of moire. In this case, too, moire can be mitigated by rotating the extending direction of the louver blades 70 in a plane in a value of 3 to 4 degrees, that is to say, 3 degrees or more, with respect to a direction of the electrode of the liquid crystal lens. Alternatively, moire can be mitigated by rotating a direction of the electrode of the liquid crystal lens in a plan view in the same degree as described above.

Embodiment 2

Figure 22:
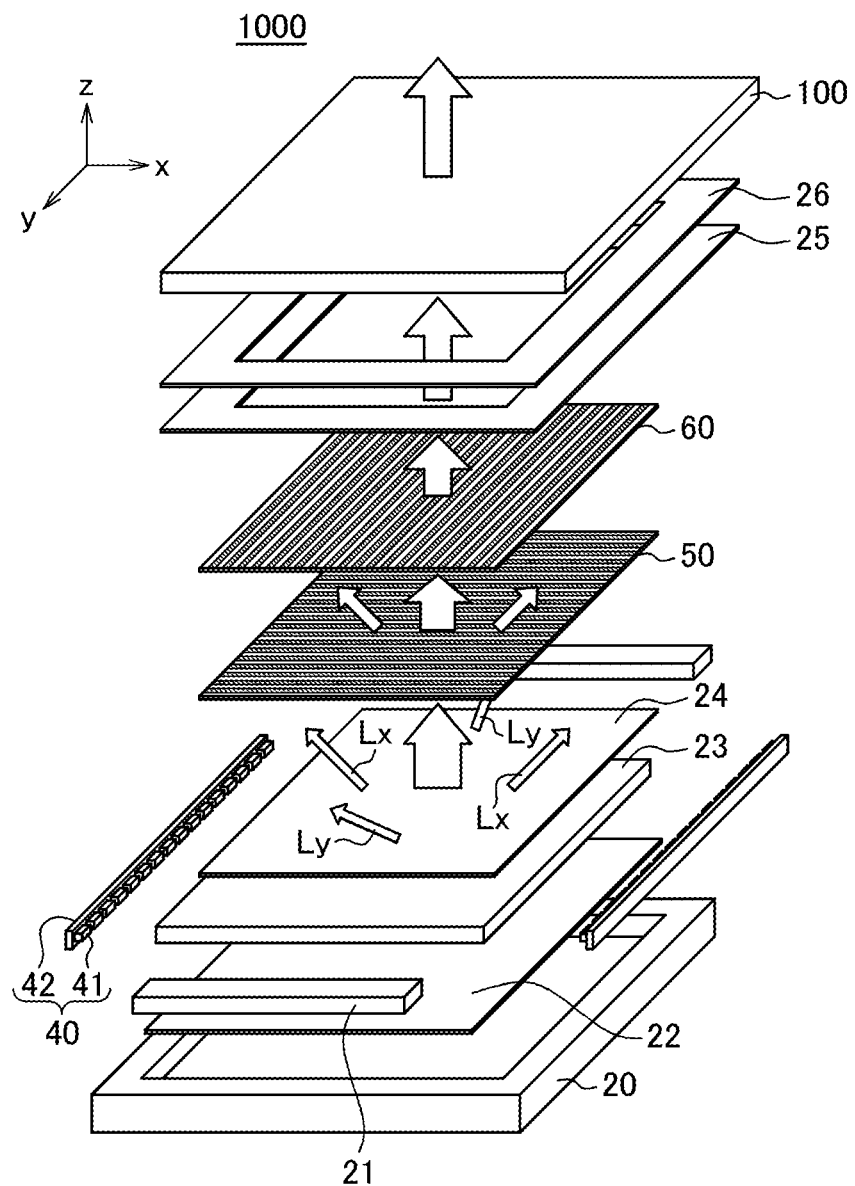
FIG. 22 is a perspective view of the lighting device according to embodiment 2.

FIG. 22 is an exploded perspective view of the lighting device 1000 according to embodiment 2. FIG. 22 differs from FIG. 6 in that FIG. 22 uses a liquid crystal lens 100 instead the transparent cover 30 of FIG. 6. The liquid crystal lens 100 in this specification includes not only convergent or divergent function but also include deflection function (function to change a direction of light). In FIG. 22, the structure from the outer frame 20 to the light shading tape 26 is the same as the structure of FIG. 6, therefore, explanation is omitted. That is to say, the light collimated by cross louver 50, 60 and so forth enters the liquid crystal lens 100 of FIG. 22.

Figure 23:
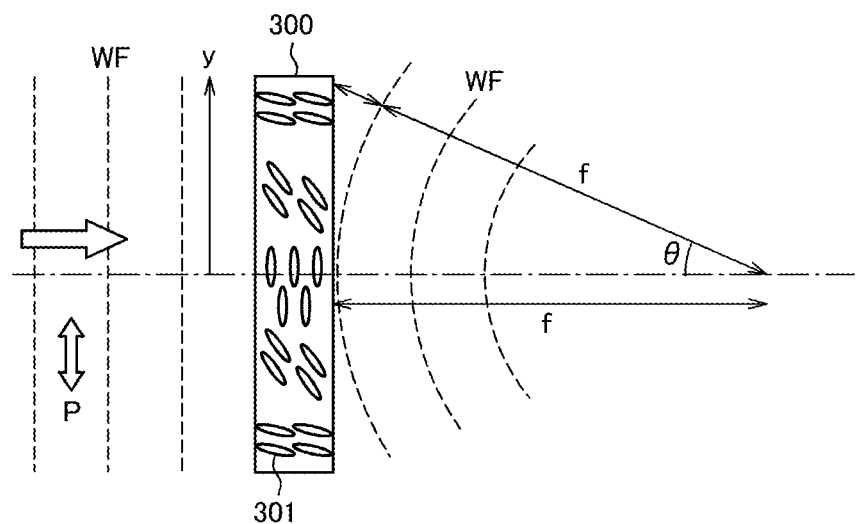
FIG. 23 is an example of a convex lens formed by a liquid crystal lens.

FIG. 23 is a cross sectional view which shows function of a liquid crystal lens. In FIG. 23, collimated light enters a liquid crystal layer 300 from left hand side. P in FIG. 3 means a polarized direction of impinging light. Generally, the polarized direction of normal light distributes randomly, however, the liquid crystal has an anisotropy in refraction; therefore, FIG. 23 shows a function of the liquid crystal layer 300 to the light polarized in P direction.

In FIG. 23, liquid crystal molecules 301 align as that a tilting angle becomes larger in going to periphery of the liquid crystal layer 300 due to electrical field from the electrodes. A liquid crystal molecule 301 has an elongated shape; effective refractive index in the long axis is larger than effective refractive index in the short axis in the liquid crystal molecule 301; therefore, refractive index in the liquid crystal layer 300 becomes larger in going to periphery, thus, a convex lens is formed. In FIG. 23, the broken line is a light wave front, and f is a focus distance.

Figure 24:
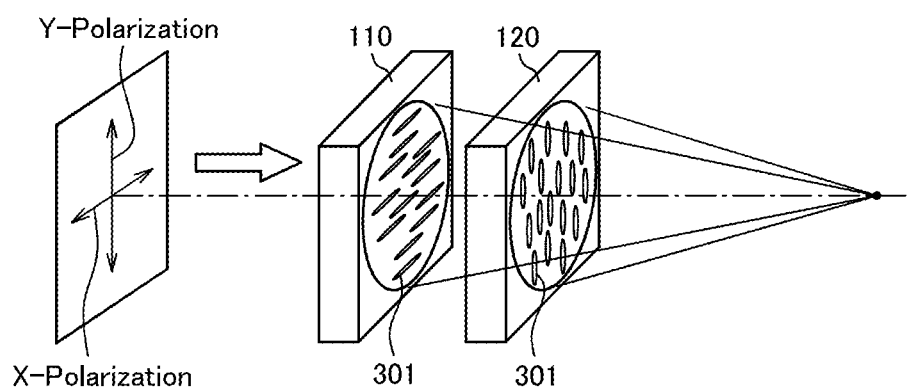
FIG. 24 is a perspective view of the liquid crystal lens structure, which has two liquid crystal lenses.

Liquid crystal has refractive index anisotropy; therefore, a second lens, which works on the light polarized in orthogonal direction to the polarized direction of light on which the first lens works, is necessary. FIG. 24 is an exploded perspective view of this lens structure. In FIG. 24, the parallelogram in left hand side is the wave front of light. In FIG. 24, The light polarized in x direction and the light polarized in y direction light enter the liquid crystal layer 300. The first liquid crystal lens 110 works on the light polarized in x direction; the second liquid crystal lens 120 works on the light polarized in y direction.

In FIG. 24, initial alignment directions of the liquid crystal molecules 301 are orthogonal between in the first liquid crystal lens 110 and the second liquid crystal lens 120. The initial alignment direction of the liquid crystal molecule 301 is determined by alignment direction of the alignment film formed in the liquid crystal lens. That is to say, the alignment directions of the alignment films of the substrates on the side from which the light enters from outside in two liquid crystal lenses, are orthogonal to each other between two liquid crystal lenses.

Figure 25:
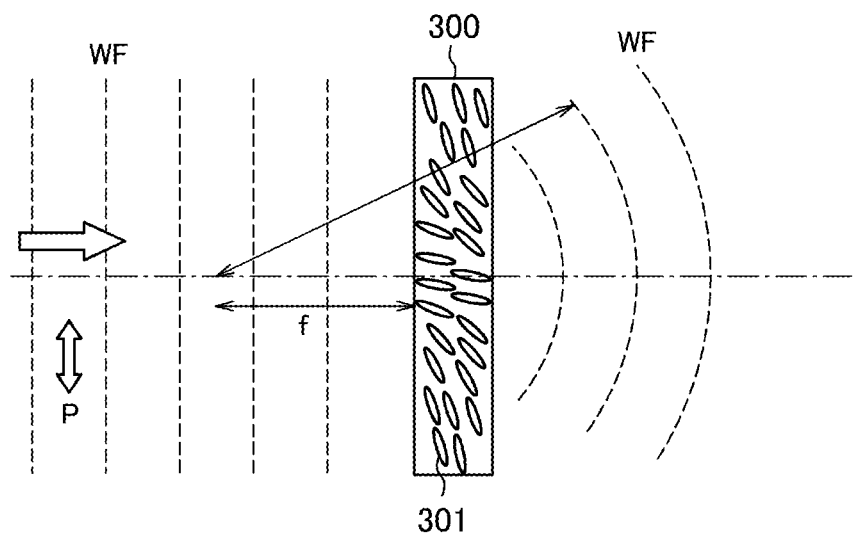
FIG. 25 is an example of a concave lens formed by the liquid crystal lens.

FIG. 25 shows to form a concave lens by liquid crystal lens. In FIG. 25, the light having the wave front WF, which is parallel to the liquid crystal layer 300, and polarized in one direction enters the liquid crystal layer 300 from left hand side. In FIG. 25, the liquid crystal molecules 301 align as that the tilting angle becomes smaller in going to periphery of the liquid crystal layer 300 due to electrical field from the electrodes. Due to the above lens structure, the wave front WF of light, which has passed the liquid crystal layer 300, becomes a curve as shown by broken line in FIG. 25, thus, concave lens is formed. In the meantime, in the case of concave lens also, two liquid crystal lenses are necessary as explained in FIG. 24.

Figure 26:
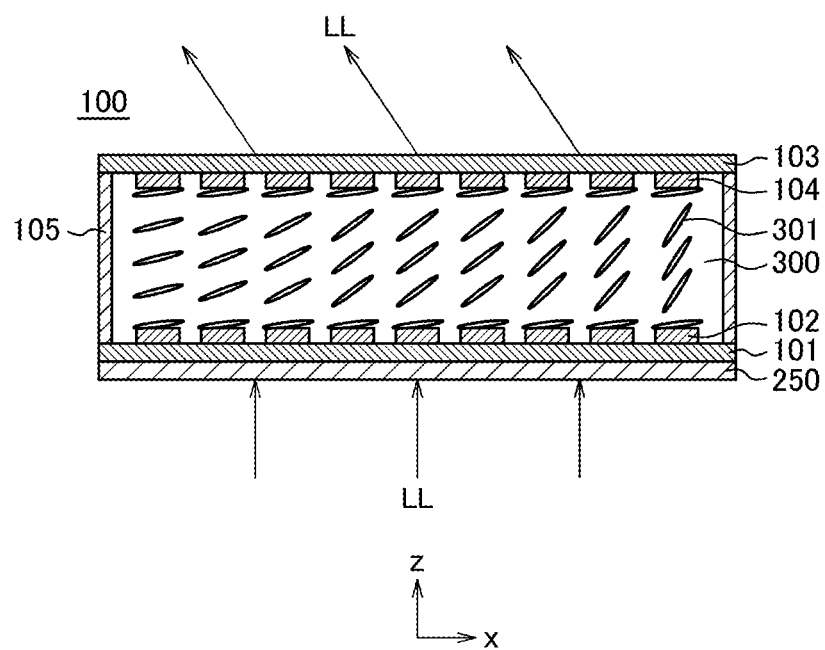
FIG. 26 is an example of the structure to deflect a light beam by the liquid crystal lens.
Figure 26:
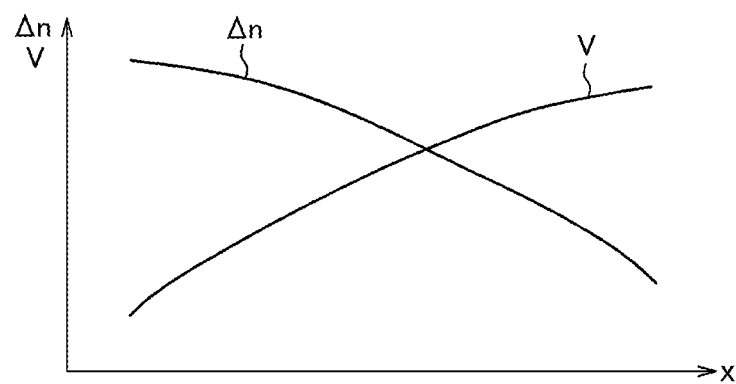

FIG. 26 shows a structure of the liquid crystal lens to deflect the light to left direction. In FIG. 26, the top figure is a cross sectional view of the liquid crystal lens 100. A first electrode 102 is formed on a first substrate 101 of the liquid crystal lens 100; a second electrode 104 is formed on a second substrate 103; the liquid crystal layer 300 is disposed between the first electrode 102 and the second electrode 104. The liquid crystal layer 300 is sealed by a seal material 105. In FIG. 26, there is only one liquid crystal lens because a polarizing plate 250 is used, instead of using two liquid crystal lenses.

In FIG. 26, when voltage V is applied to electrodes so that voltage difference between the first electrode 102 and the second electrode 104 becomes larger from left to right, as shown in the bottom figure of FIG. 26, the tilting angle of the liquid crystal molecule 301 changes according to position, thus, effective birefringence Δn of the liquid crystal layer 300 changes. According to the above explained structure of the liquid crystal layer 300, the collimated light LL, which entered from bottom side of the liquid crystal lens 100, is deflected to left direction when it exits from the liquid crystal lens 100.

Figure 27:
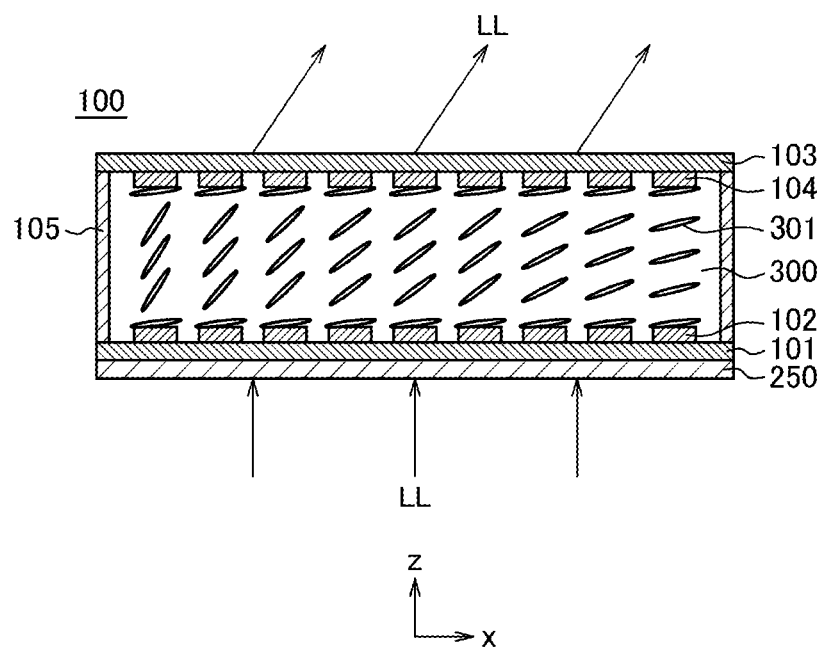
FIG. 27 is another example of the structure to deflect a light beam by the liquid crystal lens.
Figure 27:
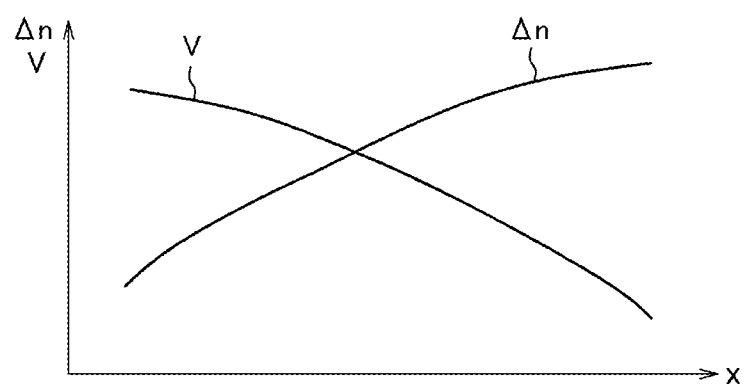

FIG. 27 shows a structure of the liquid crystal lens 100 to deflect light to right direction. In FIG. 27, the top figure is the same as the top figure of FIG. 26 except an application of voltages between the first electrode 102 and the second electrode 104. When voltage V is applied between the first electrode 102 and the second electrode 104 as that voltage difference between the first electrode 102 and the second electrode 104 becomes smaller from left to right, as shown in the bottom figure of FIG. 27, the tilting angle of the liquid crystal molecule 301 changes according to position, thus, effective birefringence Δn changes. According to the above explained structure of the liquid crystal layer 300, the collimated light LL, which entered from bottom side of the liquid crystal lens 100, is deflected to right hand direction when it exits from the liquid crystal lens 100.

Figure 28:
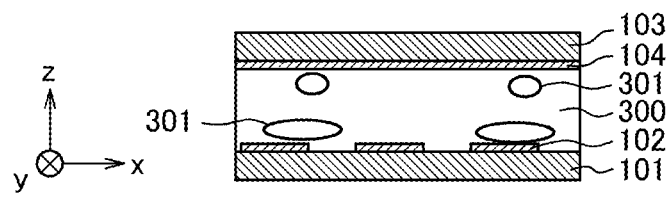
FIG. 28 is a cross sectional view of the liquid crystal lens according to first example.

FIG. 28 is a cross sectional view of a first example of actual structure of the liquid crystal lens 100. In FIG. 28, the first electrode 102 is formed on the first substrate 101, the second electrode 104 is formed on the second substrate 103, and the liquid crystal layer 300 is sandwiched between the first substrate 101 and the second substrate 103. Alignment films are formed over the first electrode 102 and the second electrode 104; however, alignment films are omitted in FIG. 28. It is the same in other figures. The initial alignment directions of the liquid crystal molecules 301 are determined by alignment treatment, as rubbing process and the like, to the alignment film.

In FIG. 28, the initial alignment direction of the liquid crystal molecules 301 on the first substrate 101 side and the initial alignment direction of the liquid crystal molecules 301 on the second substrate 103 are orthogonal to each other, namely, it is a so called TN (Twisted Nematic) type liquid crystal lens. The first electrode 102 extends in x direction and the second electrode 104 extends in y direction. However, forming the liquid crystal lens 100 in the present invention is not limited to TN type liquid crystal.

Figure 29:
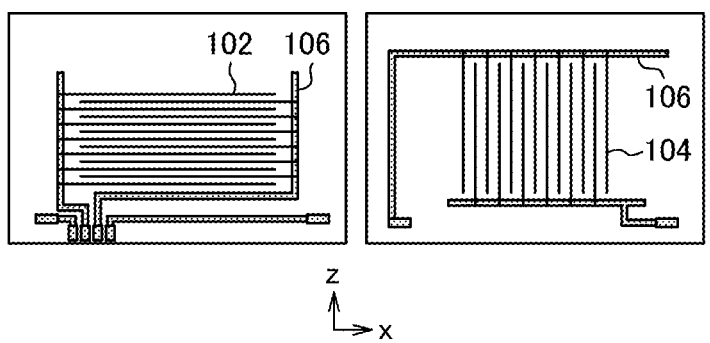
FIG. 29 is plan views of a first electrode and a second electrode of the liquid crystal lens according to first example.

The figure of left hand side of FIG. 29 is a plan view of the first electrode 102 formed on the first substrate 101. The figure of right hand side of FIG. 29 is a plan view of the second electrode 104 formed on the second substrate 103. The first electrodes 102 extend in x direction; the second electrodes 104 extend in y direction. The liquid crystal molecules 301 align according to voltage at a cross point of the first electrode 102 and the second electrode 104. That is to say, various functions of liquid crystal lens can be performed by voltages applied to the first electrode 102 and the second electrode 104.

Figure 30:
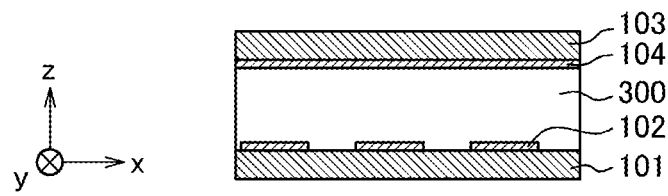
FIG. 30 is a cross sectional view of the liquid crystal lens according to second example.
Figure 31:
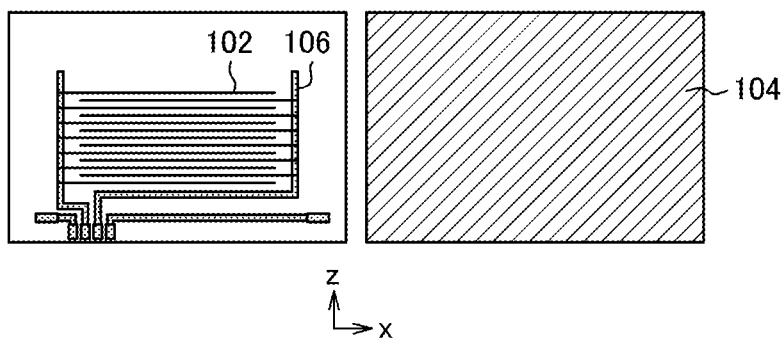
FIG. 31 is plan views of a first electrode and a second electrode of the liquid crystal lens according to second example.

FIG. 30 is a cross sectional view of a second example of actual structure of the liquid crystal lens 100. In FIG. 30, the first electrode 102 of stripe is formed on the first substrate 101, the second electrode 104 of stripe is formed on the second substrate 103, and the liquid crystal layer 300 is sandwiched between the first substrate 101 and the second substrate 103. The figure of left hand side of FIG. 31 is a plan view of the first electrode 102 formed on the first substrate 101; the first electrode extends in x direction. The figure of right hand side of FIG. 31 is a plan view of the second electrode 104 formed on the second substrate 103; the second electrode 104 is plane shaped. Second example also, as first example, various functions of liquid crystal lens can be performed by voltages applied to the first electrode 102 and the second electrode 104.

Figure 32:
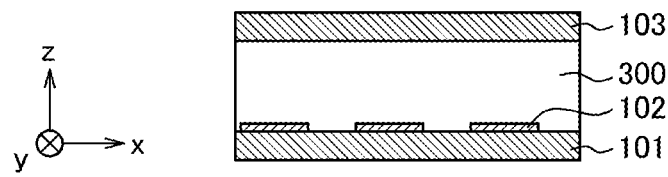
FIG. 32 is a cross sectional view of the liquid crystal lens according to third example.
Figure 33:
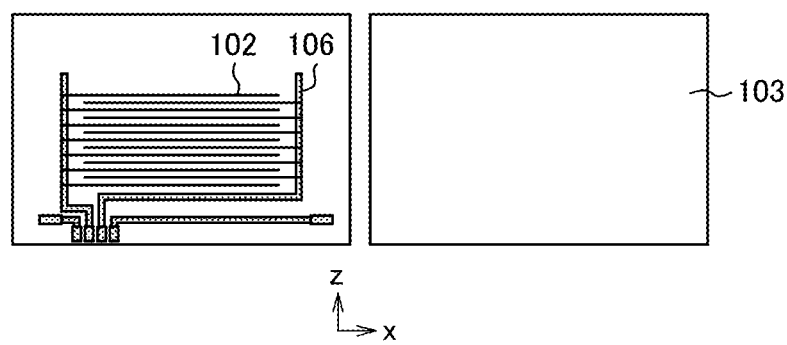
FIG. 33 is plan views of a first electrode and a second electrode of the liquid crystal lens according to third example.

FIG. 32 is a cross sectional view of a third example of actual structure of the liquid crystal lens 100. In FIG. 32, the first electrode 102 of stripe is formed on the first substrate 101; there is no electrode on the second substrate 103. The figure of left hand side of FIG. 32 is a plan view of the first electrode 102 formed on the first substrate 101; the first electrode 102 extends in x direction. The figure of right hand side of FIG. 32 shows only the second substrate 103; there is no second electrode on the second substrate 103.

The third example is a in plane field type liquid crystal lens, in which the liquid crystal is driven only by the first electrodes 102 formed on the first substrate 101. That is to say, the liquid crystal molecules 301 are aligned by potential difference formed between the striped first electrodes 102. Various types of liquid crystal lens can be formed by changing voltages between the striped first electrodes 102.

Figure 34:
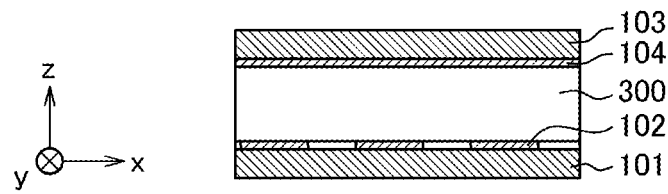
FIG. 34 is a cross sectional view of the liquid crystal lens according to fourth example.
Figure 35:
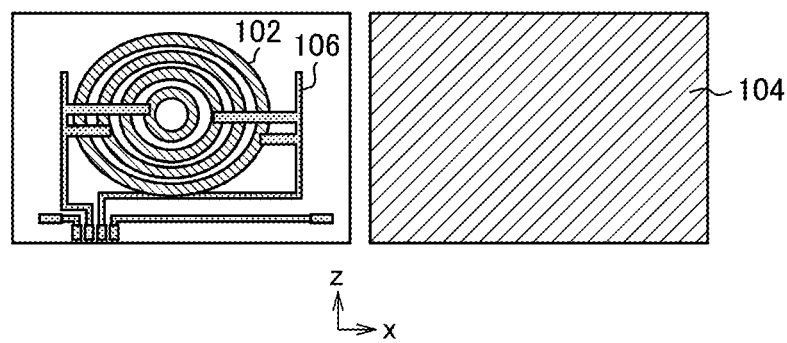
FIG. 35 is plan views of a first electrode and a second electrode of the liquid crystal lens according to fourth example.

FIG. 34 is a cross sectional view of a fourth example of actual structure of the liquid crystal lens 100. In FIG. 34, the concentric first electrodes 102 are formed on the first substrate 101, the second electrode 104 of planar shape is formed on the second substrate 103, and the liquid crystal layer 300 is sandwiched between the first substrate 101 and the second substrate 103. The figure of left hand side of FIG. 35 is a plan view of the first electrode 102 formed on the first substrate 101; the second electrode 104 is plane shaped. The first electrodes 102 are concentric shape. Each of electrodes of concentric is connected with an extraction electrode 106 to receive voltages.

In FIG. 35, a lens of various strength can be formed by changing a voltage between the first electrode 102 and the second electrode 104. Since the first electrodes 102 are concentric, the forth example can easily form a circular lens.

Figure 36:
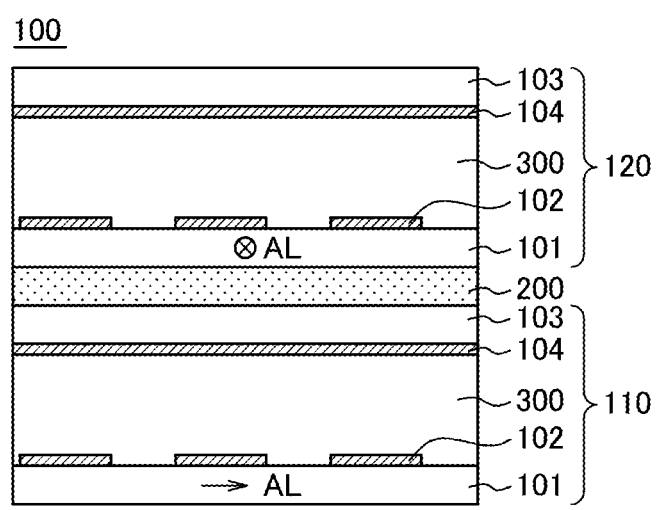
FIG. 36 is a cross sectional view of the lens structure when two liquid crystal lenses are used.

The liquid crystal lens in FIGS. 28 through 35 is explained for one piece of liquid crystal lens. The liquid crystal, however, can control light polarized in singular direction, therefore, in actual system, two liquid crystal lenses are used in pair. FIG. 36 is a cross sectional view in which the first liquid crystal lens 110 and the second liquid crystal lens 120 are superposed and are adhered through the adhesive 200.

In FIG. 36, the first liquid crystal lens 110 uses TN type liquid crystal, in which the first electrode 102 is formed on the first substrate 101, the second electrode 104 is formed on the second substrate 103, and the liquid crystal layer 300 is sandwiched between the first substrate 101 and the second substrate 103. The second liquid crystal lens 120 has the same structure. Even the structure of the first liquid crystal lens 110 and the second liquid crystal lens 120 are the same, the alignment direction AL of the alignment film of the first substrate 101 of the first liquid crystal lens 110 and the alignment direction AL of the alignment film of the first substrate 101 of the second liquid crystal lens 120 are orthogonal. That is to say, the first liquid crystal lens 110 acts on the polarized light in first direction of the incident light; and the second liquid crystal lens 120 acts on the polarized light in second direction, which is orthogonal to the first direction, of the incident light.

Figure 37:
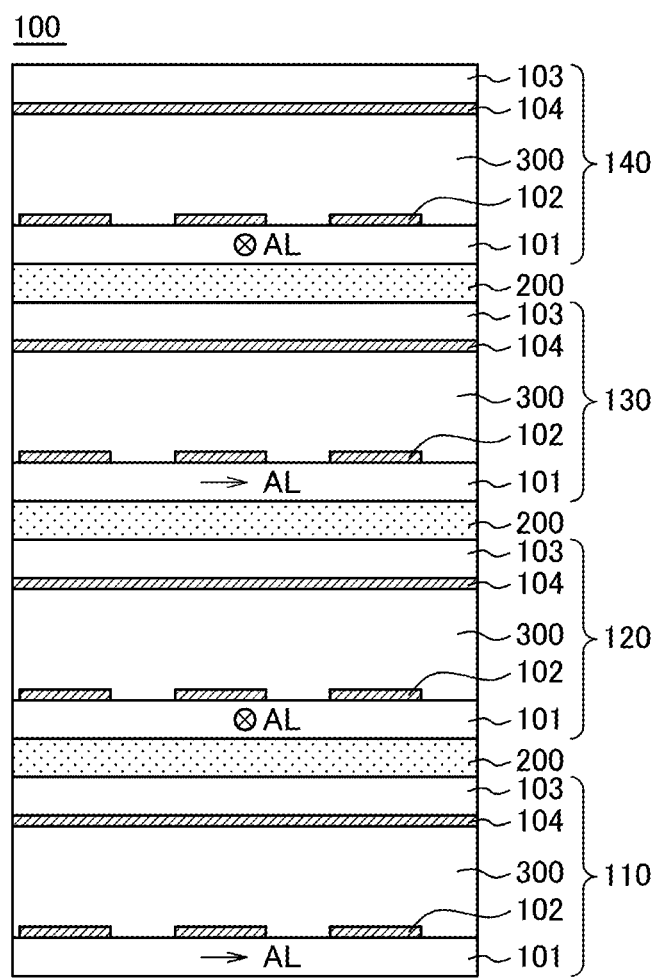
FIG. 37 is a cross sectional view of the lens structure when four liquid crystal lenses are used.

If a lens effect or a deflection effect is not enough with two liquid crystal lenses, four liquid crystal lenses can be used. FIG. 37 is an example, in which four liquid crystal lenses are assembled with the adhesive 200. In FIG. 37, the first liquid crystal lens 110, the second liquid crystal lens 120, the third liquid crystal lens 130, the fourth liquid crystal lens 140 are superposed from the bottom. The structures of the first liquid crystal lens 110 and the second liquid crystal lens 120 are the same as explained with FIG. 36. The structure and effect of third liquid crystal lens 130 and fourth liquid crystal lens 140 are the same as the liquid crystal first lens 110 and the liquid crystal second lens 120.

In FIG. 37, the alignment direction AL of the alignment film of the first substrate 101 of the first liquid crystal lens 110 and the alignment direction AL of the alignment film of the first substrate 101 of the second liquid crystal lens 120 are orthogonal; and the alignment direction AL of the alignment film of the first substrate 101 of the third liquid crystal lens 130 and the alignment direction AL of the alignment film of the first substrate 101 of the fourth liquid crystal lens 140 are orthogonal.

By the way, the alignment directions in alignment films can have other combinations than the structure of FIG. 37. In addition, each of the liquid crystal lenses are not limited to a TN type liquid crystal lens.

Figure 38:
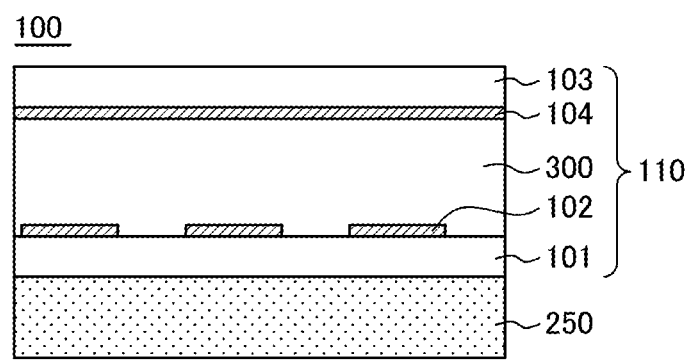
FIG. 38 is a cross sectional view of the liquid crystal lens when one liquid crystal lens and one polarization plate are used.

FIG. 38 is the structure when only one liquid crystal lens is used. In FIG. 38, the polarizing plated 250 is adhered at the bottom of the first liquid crystal lens 110. The structure and the effect of the first liquid crystal lens 110 are the same as explained with FIGS. 28 through 31. Since liquid crystal can act on light of specific polarization direction, it is necessary to make incident only the polarized light to the first liquid crystal lens 110.

In FIG. 38, the polarized light, which is controllable by the liquid crystal, is made incident to the first liquid crystal lens 110 by disposing the polarizing plate 250 at the bottom of the first substrate 101 of the first liquid crystal lens 110. If the polarizing plate 250 is used, however, the light having a polarizing axis perpendicular to the transmission axis of the polarizing plate 250 cannot pass. This problem can be mitigated by utilizing the reflective polarizing plate 250, which reflects the light that cannot pass the polarizing plate 250. That is to say, the reflected light from the reflective polarizing plate 250 is reflected again at a side of prism sheet to a direction of the reflective polarizing plate 250 with rotating the polarizing axis, thus, the light becomes to be utilized, consequently utilization efficiency of light can be improved.

Figure 39:
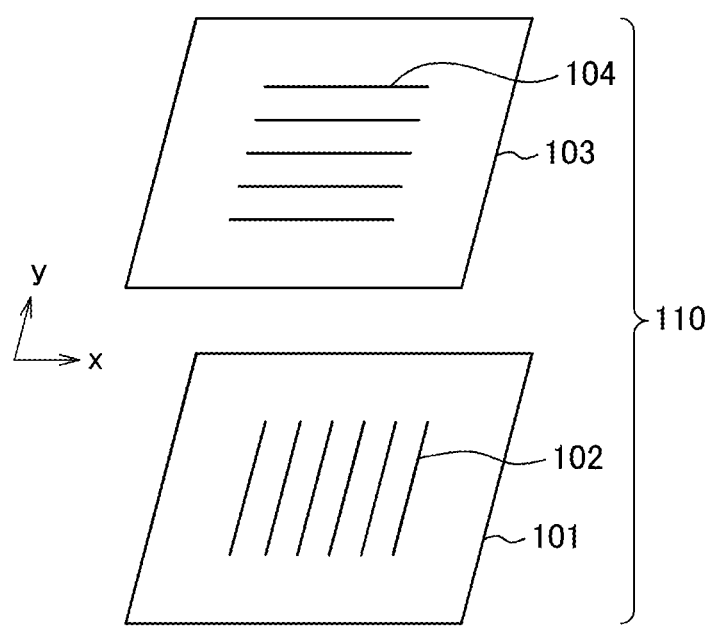
FIG. 39 is a perspective view of the configuration of the first electrode and the second electrode.

FIG. 39 is a perspective view of the liquid crystal lens of FIG. 28. The first electrodes 102 extend in y direction and are arranged in x direction on the first substrate 101. The second electrodes 104 extend in x direction and are arranged in y direction on the second substrate 103. When the first substrate 101 and the second substrate 103 are superimposed, the shape of the electrodes looks like grid in a plan view.

Figure 40:
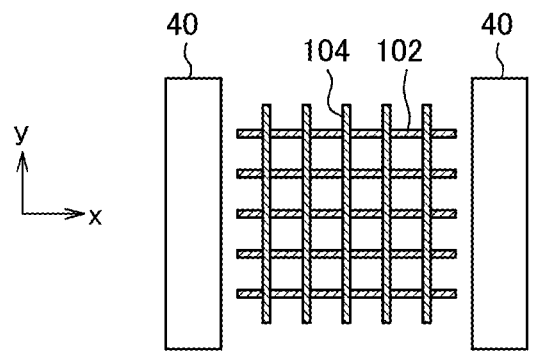
FIG. 40 is a plan view in which only an LED array and the first electrode and the second electrode of the liquid crystal lens are extracted from the lighting device of FIG. 22.

FIG. 40 is a plan view of the electrodes of the liquid crystal lens 100 and the LED array 40, which are extracted from the lighting device of FIG. 22. The liquid crystal lens 100 uses the structure of FIG. 28. Generally, the electrodes formed in the liquid crystal lens 100 are formed from a transparent electrode as ITO, however, a transparency is not 100% even in a transparent electrode; therefore, a bright region and a dark region are formed periodically. As a result, moire is generated by interference between the pattern of periodical bright and dark regions and the cross louver 50, 60.

Figure 41:
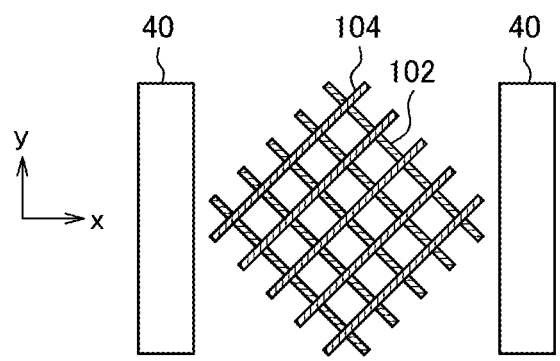
FIG. 41 is a plan view of another example in which only the LED array and the first electrode and the second electrode of the liquid crystal lens are extracted from the lighting device of FIG. 22.

FIG. 41 is a plan view of the structure that counter measure the moire. In FIG. 41, the electrode of grid shape is rotated 45 degrees in a plan view. Consequently, moire can be suppressed. The rotation has substantial effect even the angle is 3 or 4 degrees.

Figure 42:
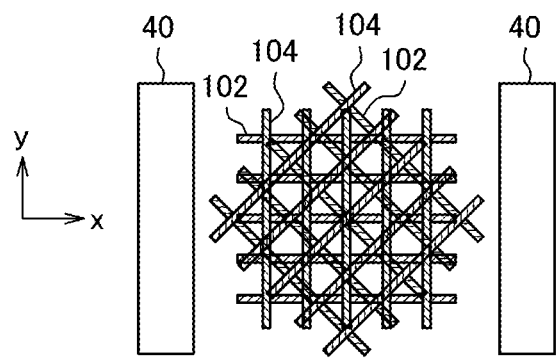
FIG. 42 is a plan view of yet another example in which only the LED array and the first electrodes and the second electrodes of two pairs of the liquid crystal lenses are extracted from the lighting device of FIG. 22.

FIG. 42 is an example when two liquid crystal lenses are used. The grid shaped electrodes formed in the first liquid crystal lens and the grid shaped electrodes formed in the second liquid crystal lens are superposed with rotation angle of 45 degrees in a plan view. The following structure, as a variation of FIG. 42, can further suppress moire; namely, the first electrodes of grid structure formed in the first liquid crystal lens are rotated 22.5 degrees with respect to x axis, and the second electrodes of grid structure formed in the second liquid crystal lens are further rotated 45 degrees.

As described above, an interference with the cross louver 50, 60 can be suppressed by rotating the electrodes formed in the liquid crystal lens 100 in various degrees. The above explained liquid crystal lens 100 is not only used for the liquid crystal lens of FIGS. 28 and 29, but also can be used for various liquid crystal lenses as e.g. the liquid crystal lens of FIGS. 30 and 31. In the meantime, the cross louver 50, 60 can be rotated instead of the rotation of the electrodes of the liquid crystal lens to acquire the same effect.

By the way, if the first electrode 102 on the first substrate 101 of the liquid crystal lens is made concentric as shown in FIGS. 34 and 35, moire is less prone to be generated caused by interference between the cross louver and the electrodes. That is to say, as far as moire, the liquid crystal lens having concentric electrodes adapts with the cross louver.

Figure 43:
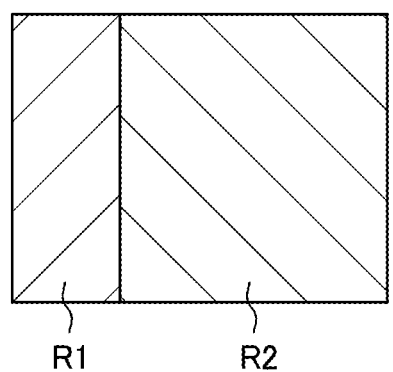
FIG. 43 is a plan view in which the liquid crystal lens is divided in a plane into two regions having different characteristics.

FIG. 43 shows a plurality of regions of different characteristics are set in plane in the liquid crystal lens 100. There is a need that a light spot has a certain distribution in brightness or a shape of a light spot is changed, not a simple light spot. Such a need can be satisfied by forming a plural region having different characteristics in plane in the liquid crystal lens 100. In FIG. 43, the electrodes, which constitute the liquid crystal lens, are changed to each other between in the region R1 and the region R2, thus, the characteristics of the liquid crystal lens are changed according the regions. In addition, finer controlling can be performed by changing voltages applied to the electrodes.

EXPLANATION OF LETTERS OR NUMERALS

1—parabolic mirror, 2—LED, 3—LED substrate, 4—heat sink, 20—outer frame, 21—resin frame, 22—reflection sheet, 23—light guide, 24—prism sheet, 25—spacer, 26—light shading tape, 30—cover, 31—emitting region, 32—collimated light, 40—LED array, 41—LED, 42—LED substrate, 50—first louver, 60—second louver, 70—louver blade, 71—transparent resin, 72—louver cover, 73—louver frame, 75—space, 80—cross louver, 90—honey comb louver, 100—liquid crystal lens, 101—first substrate, 102—first electrode, 103—second substrate, 104—second electrode, 105—seal material, 106—extraction electrode, 110—first liquid crystal lens, 120—second liquid crystal lens, 130—third liquid crystal lens, 140—fourth liquid crystal lens, 200—adhesive, 250—polarizing plate, 521—fourth electrode, 1000—lighting device, 2000—lighting device, AL—alignment direction, LL—light, Lx—leakage light, Ly—leakage light, R1—first region, R2—second region

What is claimed is:

1. A lighting device comprising:
a light guide,
LEDs set at a side surface of the light guide,
a prism sheet set on a major surface of the light guide, wherein
a first louver which extends in a first direction and
a second louver which extends in an orthogonal direction to the first direction are superposed on the prism sheet,
wherein a liquid crystal lens is disposed above the prism sheet,
wherein the liquid crystal lens has a first electrode extending in a direction rotating by a first degree in a plan view from the first direction, and the first angle is 3 degrees or more.

2. The lighting device according to claim 1,
wherein the prism sheet has a prism array, which extends in a third direction,
the first direction and the third direction cross to each other by three degrees or more, and
the second direction and the third direction cross to each other by three degrees or more.

3. The lighting device according to claim 1,
wherein a light distribution angle of the first louver is different from a light distribution angle of the second louver.

4. The lighting device according to claim 1,
wherein the first louver has a first thickness along a light axis,
the second louver has a second thickness along the light axis, and
the first thickness and the second thickness are different to each other.

5. The lighting device according to claim 1,
wherein the first louver has first louver blades, the second louver has second louver blades,
a space between the first louver blades is an empty space, and
a space between the second louver blades is an empty space.

6. The lighting device according to claim 1,
wherein the first louver has first louver blades, the second louver has second louver blades, and
a transparent resin is filled in a space between the first louver blades, and in a space between the second louver blades.

7. A lighting device comprising:
a light guide,
LEDs set at a side surface of the light guide,
a prism sheet set on a major surface of the light guide, wherein
a first louver which extends in a first direction and
a second louver which extends in an orthogonal direction to the first direction are formed in a same plane crossing to each other on the prism sheet,
wherein a liquid crystal lens is disposed above the prism sheet,
wherein the liquid crystal lens has a first electrode extending in a direction rotating by a first degree in a plan view from the first direction, and the first angle is 3 degrees or more,
wherein the liquid crystal lens has a second electrode extending in a direction rotating by the first degree in a plan view from the second direction.

8. The lighting device according to claim 1, wherein the liquid crystal lens has a second electrode which extends in orthogonal direction to the first electrode.

9. The lighting device according to claim 7, wherein the liquid crystal lens has a superposed structure of the first liquid crystal lens and the second liquid crystal lens, the first electrode is formed in the first liquid crystal lens, and the second electrode is formed in the second liquid crystal lens.

10. The lighting device according to claim 1, wherein the liquid crystal lens has a first region and a second region in a plan view, an electrode structure in the first region is different from an electrode structure in the second region.

11. The lighting device according to claim 7, wherein the first degree is 45 degrees.

12. The lighting device according to claim 7,
wherein the prism sheet has a prism array, which extends in a third direction,
the first direction and the third direction cross to each other by three degrees or more, and
the second direction and the third direction cross to each other by three degrees or more.

13. A lighting device comprising:
a light guide,
LEDs set at a side surface of the light guide,
a prism sheet set on a major surface of the light guide, wherein a louver having a honey comb structure extending in a first and second direction the second direction being orthogonal to the first direction in a plan view is disposed on the prism sheet, wherein a liquid crystal lens is disposed above the prism sheet, wherein the liquid crystal lens has a first electrode extending in a direction rotating by a first degree in a plan view from the first direction, and the first angle is 3 degrees or more, wherein the liquid crystal lens has a second electrode extending in a direction rotating by the first degree in a plan view from the second direction, wherein the first degree is 22.5 degrees.

14. The lighting device according to claim 13,
wherein an inside of the honey comb structure is an empty space.

15. The lighting device according to claim 13
wherein a liquid crystal lens is disposed above the prism sheet.

* * * * *